J. GERBEHAYE.
TYPEWRITING MACHINE.
APPLICATION FILED FEB. 19, 1921.

1,406,845.

Patented Feb. 14, 1922.
3 SHEETS—SHEET 1.

INVENTOR:
JULES GERBEHAYE.
ATTORNEY.

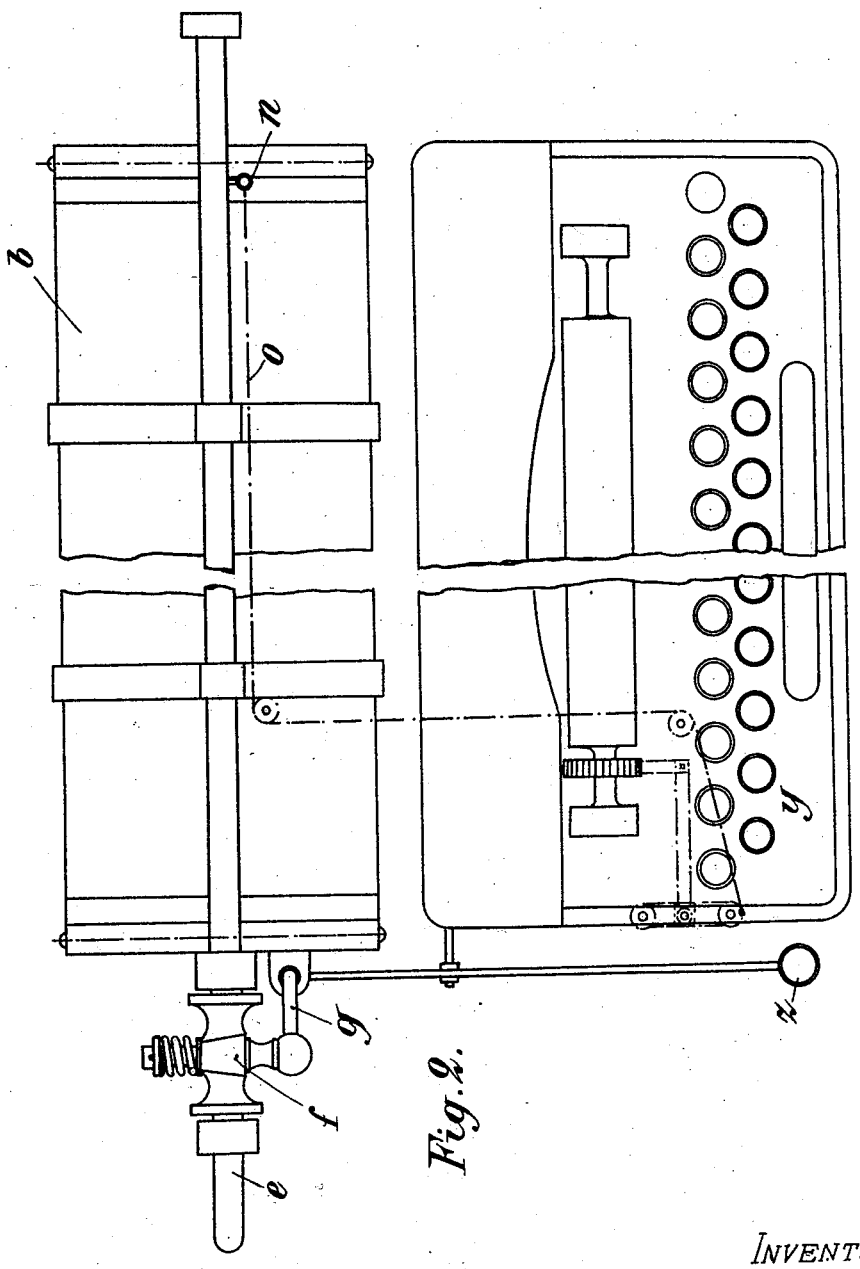

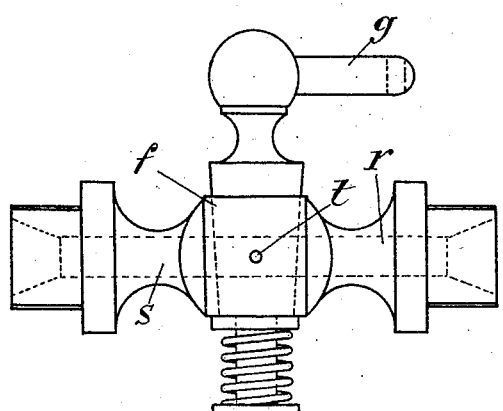
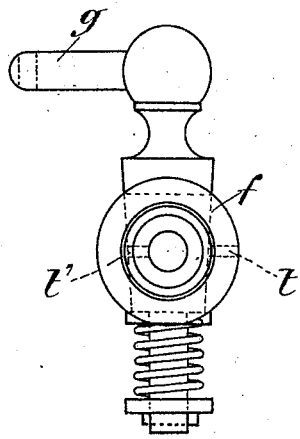
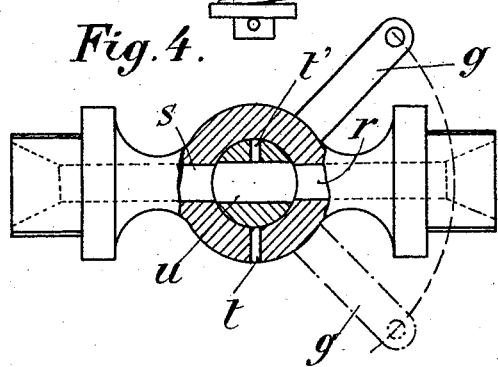
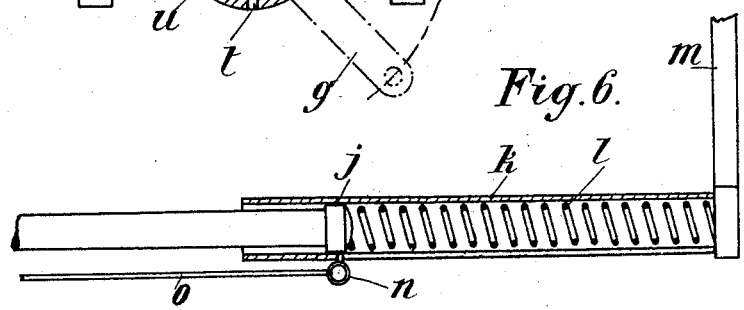

UNITED STATES PATENT OFFICE.

JULES GERBEHAYE, OF TIRLEMONT, BELGIUM.

TYPEWRITING MACHINE.

1,406,845.  Specification of Letters Patent.  Patented Feb. 14, 1922.

Application filed February 19, 1921. Serial No. 446,355.

*To all whom it may concern:*

Be it known that I, JULES GERBEHAYE, a subject of the King of Belgium, and resident of Tirlemont, Belgium, have invented certain new and useful Improvements in Typewriting Machines, of which the following is a specification.

My present invention has for its object to provide a mechanical device of great simplicity, whereby the carriage may be moved automatically back to its initial position upon its arrival at the end of its stroke, this backward movement being obtained by simply pressing on a key or lever at the level of the bar.

The principle involved by this invention consists primarily in causing the backward movement of the carriage at the end of its stroke by the utilization of the energy of compressed air contained in an air reservoir arranged at the rear of the machine or at any other suitable place; said compressed air being brought through a conduit, into which a cock or valve of special construction is inserted, into a cylinder within which an air tight piston is adapted to be moved, said piston being connected to a disk to which is attached the cord serving to provide for the line-spacing, said disk bearing against one end of a coil spring which will be tensioned or compressed when the operator actuates the return key, said spring being suitably guided in a cylindrical casing.

The cock or valve inserted in to the air conduit leading from the reservoir is actuated by means of a key or lever by the operator. The carriage having reached the end of its travel, the operator will actuate the key or lever so as to bring said cock in its open position, whereby compressed air from the reservoir is allowed to act upon the piston to push the same backwardly, said piston compressing the coil-spring by means of the disk, to which is attached the cord or cable which actuates the line spacing lever and moves the carriage with it to its initial position ready to commence another line.

Upon the closing of said cock, the connection between the air reservoir and the movable piston will be shut off; however in order to discharge compressed air contained at this moment in the cylinder before the piston and between the latter and the cock, the plug of the cock, besides its conduit enabling air to pass from the reservoir into the cylinder, has another narrow conduit or passage discharging into the atmosphere and which by the movement of the handle of the cock permits of the compressed air contained in the cylinder being discharged into the outer atmosphere. Owing to the discharge of said compressed air from the cylinder, the coil-spring causes the disk and line spacing lever to be moved backwardly to their initial position.

In this way the operator is no longer obliged to move the carriage backwardly by hand after each line of writing; it will be sufficient for him to depress a key and said backward movement will be effected automatically.

The pressure of compressed air within the reservoir will be conveniently of about 5 atm. Here are various means for having air under pressure in said reservoir.

First I may use a commercial bottle containing air under high pressure and the outlet of which is provided with a pressure reducing device whereby any desired pressure may be given to the air discharged from said bottle. The partially expanded air will be conducted into the reservoir placed at the rear of the machine or elsewhere.

Or atmospheric air may be forced directly into the reservoir by means of any suitable pump provided with a foot-lever or the like. The operator may even during the operation compress the required quantity of air by the utilization of the movements imparted to the different keys of the keyboard or the spacing bar, said keys under the pressure of the fingers actuating small pistons of air pumps.

In order to enable the nature of the invention to be readily understood, I have illustrated the same by way of example in the accompanying drawings, wherein:

Fig. 2 is a plan view of the improved device as applied to a typewriter.

Figs. 3 to 5 show two elevations and a plan view of the compressed air cock.

Fig. 6 is a detail sectional view showing the coil-spring actuated by the piston.

Figure 1:
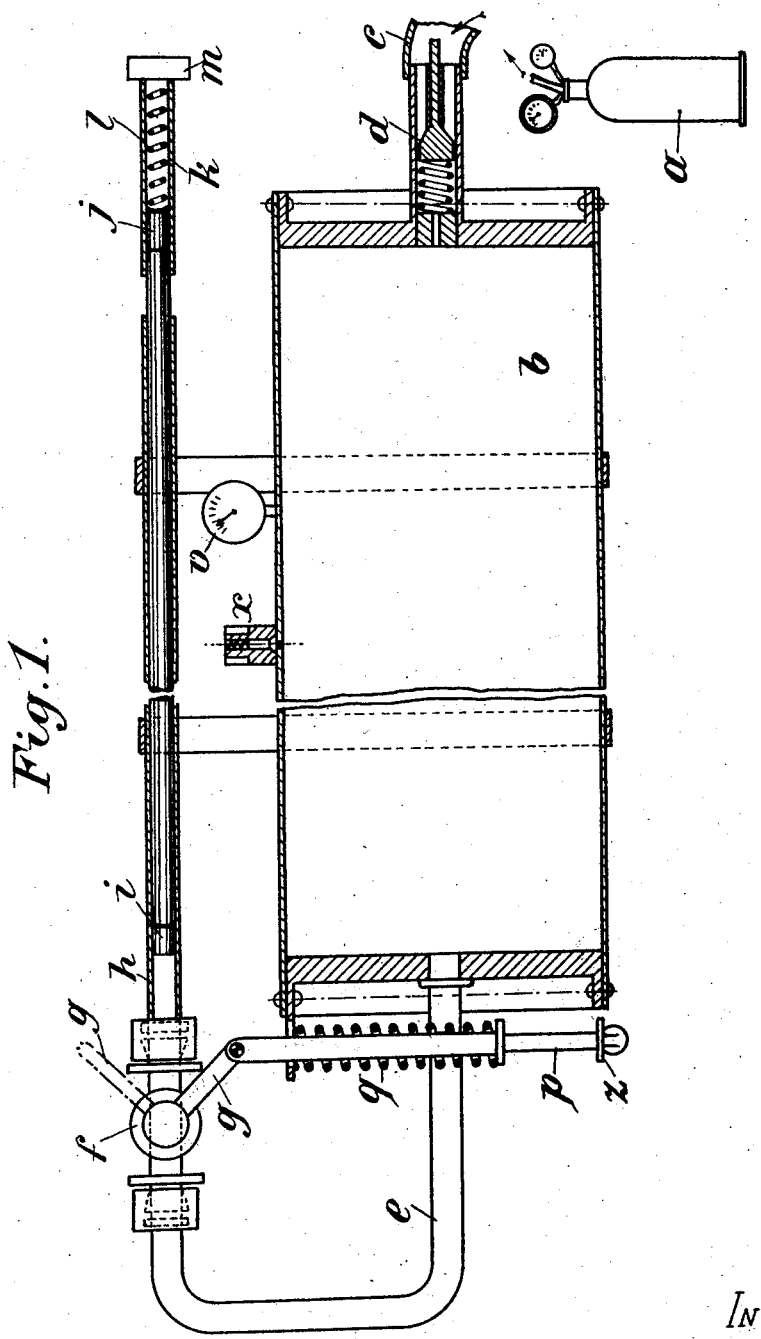
Fig. 1 shows a sectional elevation of the whole device.

Referring to the drawings, $a$ designates a bottle or flask containing atmospheric air under high pressure, say for instance 100 atm. and communicating with a compressed air reservoir $b$ arranged either at the rear of the machine or at any other suitable place, by means of a pipe $c$ provided with an air pressure reducing device $d$.

From the reservoir $b$ the compressed air passes through a conduit $e$ into which is inserted a cock $f$, the handle $g$ of which is connected to a rod $p$ actuated by a spring $q$ and adapted to be operated by the writer through the agency of a key $z$ of the keyboard $y$.

$h$ designates a tube within which a movable piston $i$ is adapted to be reciprocated, one end of said piston or plunger terminating in a disk $j$ adapted to be reciprocated within a cylinder $k$ (Figs. 1 and 6) within which is arranged a coil-spring $l$ intended to produce the line-spacing by means of the disk $j$ having an eyelet to which a cable $o$ is attached. $m$ designates the bar of the carriage.

The operation of the improved device will be easily understood: The carriage having reached the end of its travel after the completion of a line, the operator will press on the key $z$ operating the rod $p$, whereby the handle $g$ of the cock $f$ will be rotated through an angle of 90° to bring the plug of said cock to the position shown in Fig. 4, the conduit $u$ thereof being thus in alinement with the openings $s$ and $r$ in the cock casing and a free communication between the compressed air reservoir and the tube $h$ containing the plunger $i$ being thus provided. Said plunger $i$ will be forced to the right by the action of compressed air, compressing the coil-spring $l$ and moving the carriage with it until the latter will be brought back to its initial position, ready to commence again its step-by-step movement for the writing of another line. Then the operator will release the operating key $z$ of the rod $p$, whereby the latter by the action of the spring $q$ will act to bring the handle $g$ back to its normal position and turn the cock-plug through an angle of 90° in opposite direction. Thus the interior of the tube $h$ will be brought into communication with the outer atmosphere through the narrow conduit $t'$ in the plug, the conduit $u$ and the conduit $t$ in the cock casing (Fig. 6), and the compressed air will escape suddenly so that there will be no pressure within the tube $h$ during the movement of the carriage to the left. The coil-spring $l$ acts to bring the disk $j$ and line-spacing lever back to their initial positions.

The compressed air reservoir is provided with a gauge $v$ to show the inner pressure and a safety valve $x$.

I wish it to be understood that my invention is not limited to the exact embodiment herein shown and described by way of example, it being understood that changes may be made in the details of construction without in any way departing from the spirit of this invention.

Having now fully described my said invention, what I claim and desire to secure by Letters Patent, is:

A carriage return mechanism for typewriters, comprising a tube arranged at the rear of a typewriter, a piston slidable in the tube, having one end projecting beyond the end of the tube, the typewriter carriage having a projection thereon, a sleeve mounted on the projection in axial alignment with the tube and having the projecting end of the piston slidably fitting therein, a disk slidable in the sleeve, a flexible connection between the disk and the line spacing mechanism on the typewriter carriage for operating said mechanism in the movement of the disk in the sleeve, a spring interposed between the disk and the projection on the carriage for cushioning the carriage with relation to the piston and permitting movement of the disk to operate the line spacing mechanism, an auxiliary air reservoir arranged in the rear of the typewriter having communication with the tube, a key controlled valve governing said communication to the tube, and a main reservoir for supplying air to the auxiliary reservoir, said auxiliary reservoir being adapted to contain a charge of air for operating the piston.

In testimony whereof I have hereunto set my hand in presence of two witnesses.

JULES GERBEHAYE.

Witnesses:
GEORGES DELERGUNE,
EMILE VONSERESZIELE.